UNITED STATES PATENT OFFICE.

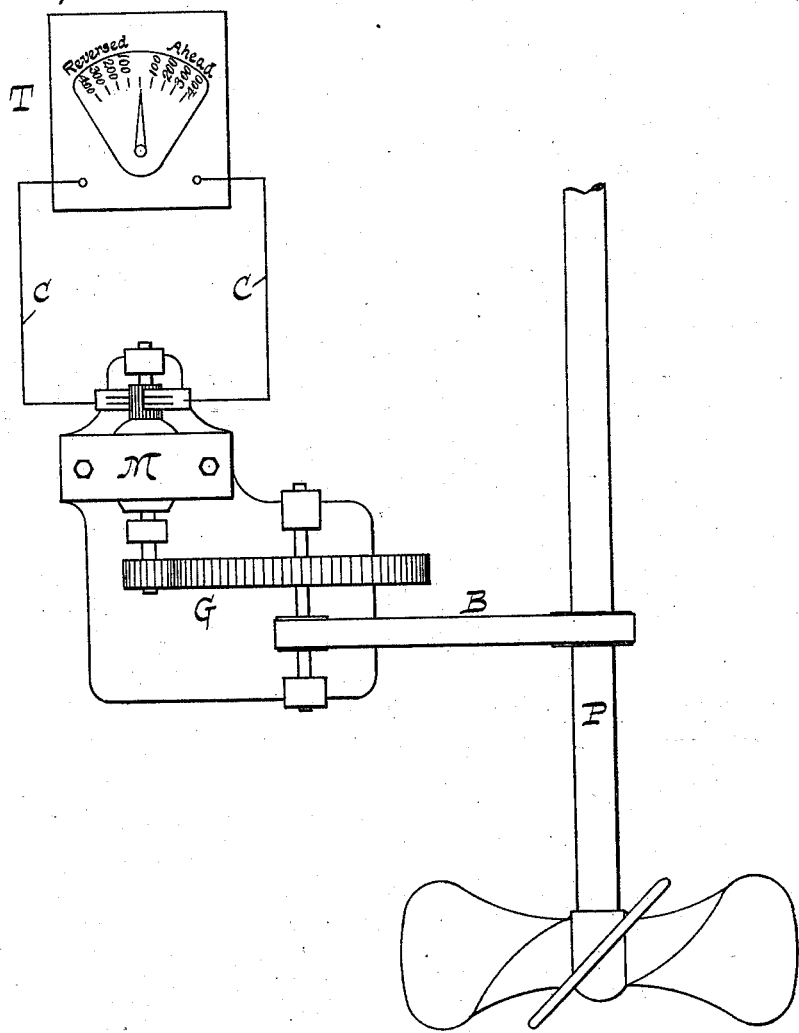

MATHIAS PFATISCHER, OF PHILADELPHIA, PENNSYLVANIA, ASSIGNOR TO THE ELECTRO-DYNAMIC COMPANY, OF PENNSYLVANIA.

INDICATOR FOR THE SPEED OF REVOLUTION OF PROPELLERS

SPECIFICATION forming part of Letters Patent No. 561,430, dated June 2, 1896.

Application filed August 12, 1895. Serial No. 559,083. (No model.)

*To all whom it may concern:*

Be it known that I, MATHIAS PFATISCHER, of Philadelphia, Pennsylvania, have invented a new and useful Improvement in Apparatus for Indicating the Speed of Revolution of Ships' Propellers and the Like, of which the following is a description, referring to the accompanying drawing, which forms a part of this specification.

The objects of the invention are to indicate at a distance from the propeller or other apparatus the exact speed at which it is rotated, and to accomplish this prime object in a very simple, accurate, and reliable manner. Heretofore various mechanical and electrical means have been employed to fulfil similar purposes with more or less satisfaction; but by the employment of the improvement which forms the subject-matter of this application only a single electric circuit need be carried from the device whose speed is to be indicated to the indicator or telltale at a distant part of the ship.

Briefly stated, the invention consists of a source of electric power which is actuated by and varies with the speed of rotation of the propeller or other part whose speed is to be indicated. The current is introduced into a circuit which extends to the point where the telltale or indicator is to be situated, and there actuates an indicating device, so that the indicator, when properly calibrated, directly shows the speed of rotation.

In the accompanying drawing a preferred form of the invention is shown.

The invention is of such a nature that it will be readily understood by reference to the drawing.

At P is indicated a propeller-shaft by which is driven, through suitable belting B and gearing G, a magneto-electric machine M. This magneto-electric machine, having a magnetic field of substantially constant intensity, generates in the armature an electromotive force which is substantially proportional to the speed. An electric circuit C leads from the brushes of the magneto to a speed-indicator T, the index of which moves through an angle proportional to the current passing through the circuit, and therefore, the resistance being constant, proportional to the electromotive force generated in the magneto-machine, and also proportional to the speed of the propeller-shaft P. This speed-indicator T, or telltale, may be located in the pilot-house of the ship, while the magneto is located at a convenient position near the propeller-shaft or some other rotating part of the ship's engine. In this manner the card or dial of the speed-indicator need only be calibrated with equal divisions corresponding to the different rates of speed in order to give an accurate and direct reading of the speed at which the propeller is rotated.

In place of the permanent magnets of the magneto-machine, electromagnets excited by constant current may be employed as substantially equivalent of the magneto.

If the speed-indicator be an instrument similar to certain forms of Weston volt meters, or ammeters, which indicate the direction as well as the strength of the current passing through the instrument, then the speed-indicator will show whether the ship's engines are going ahead or are reversed as well as the precise speed.

Two or more of the indicators or telltales may be placed on a single circuit C, so that there may be one in the engine-room and one in the pilot-house, and, if desired, one in the captain's cabin. In any case it is only necessary to run a single circuit through all the instruments.

Having now briefly set forth my invention, what I claim as new, and desire to secure by these Letters Patent, together with all such modifications as may be made by mere skill in the art, and with only the limitations as expressed or by law implied in view of the state of the art, is the following:

In combination with a ship's propeller-shaft or other rotary body, a magneto-machine, mechanical operating connections between the said body and the said magneto-machine, and an indicator-circuit for the said magneto with a suitably-graduated galvanometer included therein to indicate the speed of the said shaft or rotary body, substantially as set forth.

In testimony whereof I have hereunto set my hand, at Philadelphia, Pennsylvania, this 7th day of August, A. D. 1895.

MATHIAS PFATISCHER.

In presence of—
JOHN RODGERS,
L. BANCROFT MELLOR.